(12) United States Patent
Takeuchi

(10) Patent No.: US 7,841,013 B2
(45) Date of Patent: Nov. 23, 2010

(54) IMAGE FORMING DEVICE, COMPUTER PROGRAM, AND DATA FILE

(75) Inventor: Shigeki Takeuchi, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1006 days.

(21) Appl. No.: 11/614,829

(22) Filed: Dec. 21, 2006

(65) Prior Publication Data

US 2007/0192876 A1  Aug. 16, 2007

(30) Foreign Application Priority Data

Feb. 7, 2006   (JP)   ............... 2006-030126
Feb. 7, 2006   (JP)   ............... 2006-030145

(51) Int. Cl.
H04N 7/16   (2006.01)
(52) U.S. Cl. ............... 726/29; 726/19; 726/5; 713/170; 382/112; 382/116
(58) Field of Classification Search ............... None
See application file for complete search history.

(56) References Cited

U.S. PATENT DOCUMENTS

| | | | |
|---|---|---|---|
| 6,012,638 A | 1/2000 | Ackley | |
| 6,149,059 A | 11/2000 | Ackley | |
| 6,321,986 B1 | 11/2001 | Ackley | |
| 6,545,767 B1 | 4/2003 | Kuroyanagi | |
| 2002/0074405 A1 | 6/2002 | Hadano et al. | |
| 2005/0168769 A1* | 8/2005 | Kim et al. ............... | 358/1.14 |

FOREIGN PATENT DOCUMENTS

| | | |
|---|---|---|
| JP | 05081492 A | 4/1993 |
| JP | 2000082108 A | 3/2000 |
| JP | 2000148904 A | 5/2000 |
| JP | 2001043308 A | 2/2001 |
| JP | 2002062803 A | 2/2002 |
| JP | 2002216088 A | 8/2002 |
| JP | 2002236868 A | 8/2002 |
| JP | 2002-316485 | 10/2002 |
| JP | 2003-134327 | 5/2003 |
| JP | 2003323512 A | 11/2003 |
| JP | 2003-348079 | 12/2003 |

(Continued)

OTHER PUBLICATIONS

Japanese language office action and its English language translation for corresponding Japanese application 2006030126 lists the references above.

(Continued)

Primary Examiner—Nasser Moazzami
Assistant Examiner—Fikremariam Yalew
(74) Attorney, Agent, or Firm—DLA Piper LLP (US)

(57) ABSTRACT

An image forming device prints out a data file including a data body, which is printed out, and additional data, which is not printed out. The additional data includes at least authentication data. The image forming device includes an identification entry unit, an operator authentication unit, and a print execution unit. The identification entry unit accepts an entry of the identification data of an operator. The operator authentication unit authenticates the identification data of the operator by the authentication data of the data file. The print execution unit prints out result data, according to whether the authenticated identification data is appropriate or inappropriate, along with the data body of the data file.

17 Claims, 12 Drawing Sheets

FOREIGN PATENT DOCUMENTS

| | | | |
|---|---|---|---|
| JP | 2004-090517 | | 3/2004 |
| JP | 2005191765 | A | 7/2005 |
| JP | 2006031427 | A | 2/2006 |
| WO | 9847101 | A2 | 10/1998 |

OTHER PUBLICATIONS

European Search for corresponding European application No. 06125228.4-1245 lists the references above.

Japanese language office action and its English language translation for corresponding Japanese application 2006030145 lists the references above.

Japanese language office action and its English language translation for corresponding Japanese application 2006030126 lists the references above.

* cited by examiner

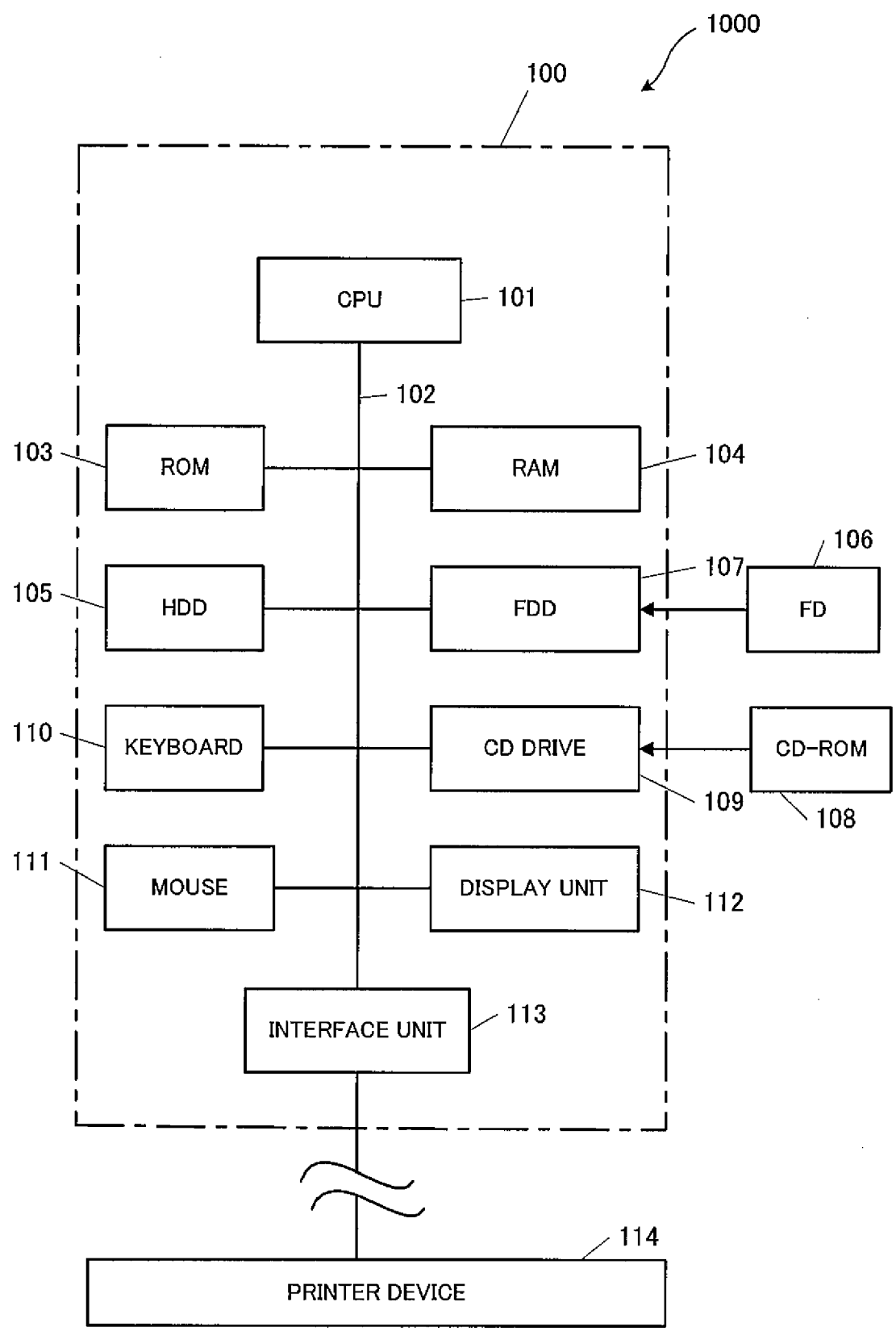

FIG. 8

■SIGNATURE INFORMATION : VERIFICATION OK

SIGNER : Murata Taro

MAIL : murata.taro@mail.com

DATE : 2005/11/28 10:00:05 GMT

COUNTRY : JP

ORGANIZATION : Muratec, Ltd.

HASH ALGORITHM : SHA1

■CERTIFICATE INFORMATION : VERIFICATION OK

PERSON TO BE VERIFIED : Murata Taro

ISSUER : Murata CA1

START OF EFFECTIVE PERIOD : 2005/10/01 11:15:23 GMT

END OF EFFECTIVE PERIOD : 2010/10/01 11:15:23 GMT

■TIMESTAMP INFORMATION : VERIFICATION OK

DATE : 2005/11/28 10:00:05 GMT

TIMESTAMP AUTHORITY : Murata TSA

CERTIFICATE AUTHORITY : Murata CA2

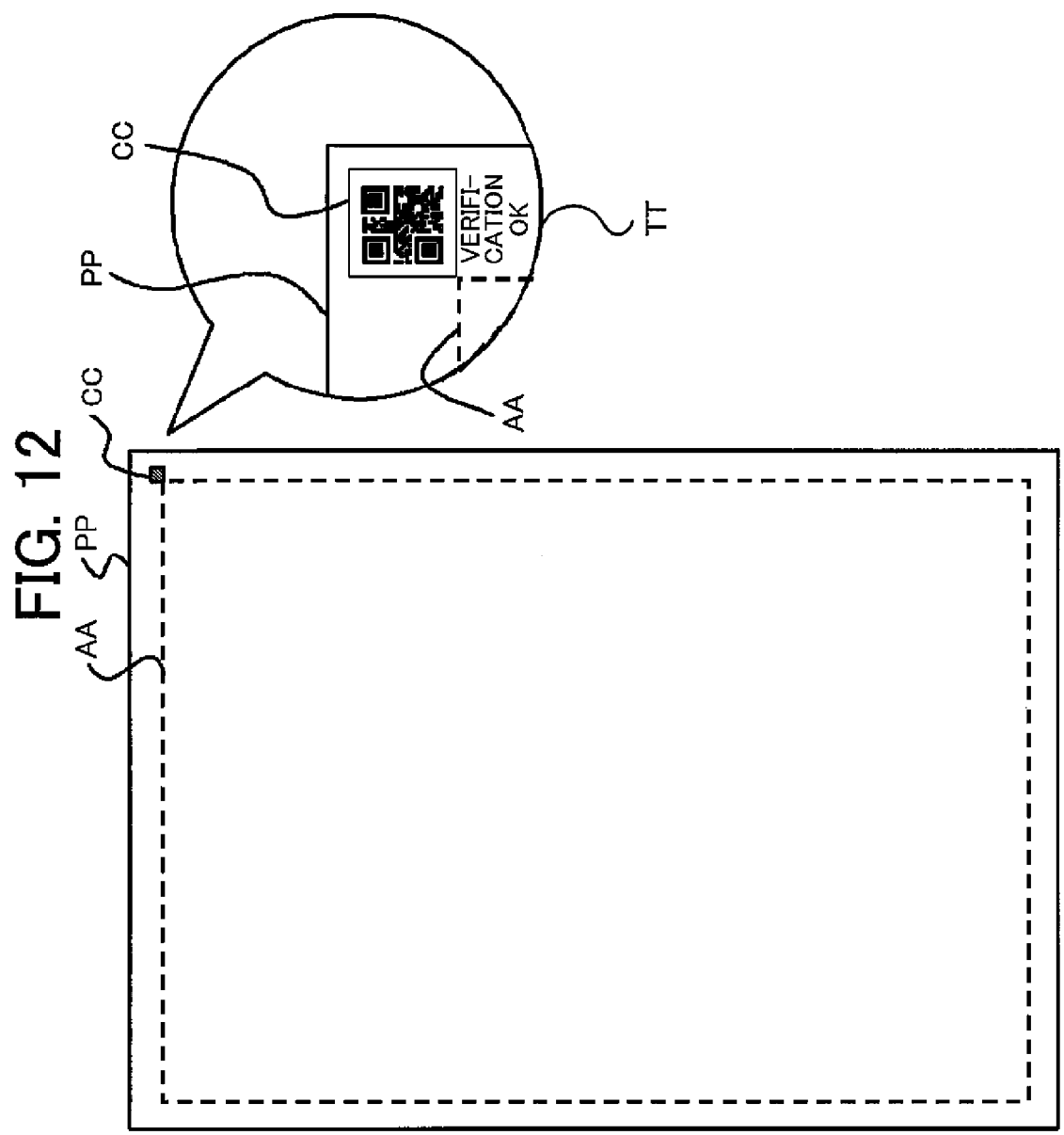

IMAGE FORMING DEVICE, COMPUTER PROGRAM, AND DATA FILE

RELATED APPLICATIONS

This application claims priority under 35 USC 119 in Japanese patent application nos. 2006-030126 and 2006-030145, filed in Japan on Feb. 7, 2006, which applications are hereby incorporated by reference in their entireties.

BACKGROUND OF THE INVENTION

1. Field of the Invention

The present invention relates to an image forming device that prints out a data file, and particularly relates to an image forming device that prints out a data file including a data body, which is printed out, and additional data, which is not printed out.

2. Description of the Related Art

A data file including a data body such as document data and image data is generally managed by a computer system. The data file includes authentication data as additional data, and an original copy of the data file is assured.

The authentication data may include, for example, an electronic signature and a timestamp. A hash value of the data body of the data file and the timestamp are encoded and stored in the electronic signature. The hash value of the data body and the date and time when the authentication data was generated are encoded and stored in the timestamp.

A hash value can be generated from the data body of the data file, and the hash value of the data body stored in an electronic signature can be decoded. When the hash values match, it can be confirmed that the data body has not been falsified. By a similar process, it can be confirmed that the electronic signature corresponds with the timestamp, and date and time when the authentication data has been assigned to the data file can be confirmed by the timestamp.

Although a computer device manages such a data file, the computer device may transmit the data file to a printer device, and the data file may be printed out onto a printing medium. In such a system, for example, the computer device converts the data file into print data, and the print data is transmitted to the printer device. Therefore, the printer device prints out the received print data.

In such a case, although the data body of the data file is of course printed out, the authentication data used for an authentication process is not printed out.

Further, the data file with the authentication data is generally important. According to one conventional art, when a data file with authentication data is transmitted from a computer device to a printer device, the printer device executes an authentication process on the data file by the authentication data. Then, the printer device prints out an authentication result as an authentication mark or the like along with the data file.

According to another conventional art, authentication data as described above is printed out as machine-readable print data along with data body of a data file. In this case, a scanner device scans a print result, and the authentication data is decoded to execute an authentication process.

According to another conventional art, identification data of an operator is entered into such a scanner device, and an authentication process is executed on the identification data by authentication data decoded from a scanned image. When a determination is made that the operator is inappropriate, warning data is added to a scan result, and the scan result is output.

In the above-described device, the authentication process is executed on the identification data of the operator by the authentication data scanned from a printed-out image. When the operator is determined to be inappropriate, warning data is added to the scan result, and the scan result is printed out.

An operator, who scans a printed-out image by the scanner device, is authenticated by the authentication data decoded from the printed-out image. However, an operator, who prints out a data file stored in the computer device by the printer device, cannot be authenticated by the authentication data of the printed-out data file.

In the above-described device, the authentication result is printed out along with the data file. Therefore, the authentication result may be confirmed along with the printed-out image of the data file. However, the authentication data includes various data such as the electronic signature and the timestamp as described above. Therefore, in order to print out a detailed authentication result, when the authentication data or the like is included in the authentication data, a volume of the authentication result increases.

However, when printing out the authentication result along with the data file as described above, since an original object is to print out the data file, it is difficult to secure a sufficient print region for the authentication result. Therefore, a simple authentication mark or the like has been conventionally printed out to enable just success or failure to be distinguished in the authentication result. However, a detailed authentication result cannot be confirmed with such a simple authentication mark. In addition, data of the detailed authentication result cannot be managed based on the print result.

SUMMARY OF THE INVENTION

In order to overcome the problems described above, the present invention authenticates an operator, who prints out a data file stored in a computer device by a printer device, by authentication data of the data file. The present invention also enables a detailed authentication result to be obtained from a print result.

According to one aspect of a first embodiment, an image forming device prints out a data file including a data body, which is printed out, and additional data, which is not printed out. The additional data of the data file includes at least authentication data. The image forming device includes an identification entry unit, an operator authentication unit, and a print execution unit. The identification entry unit accepts an entry of identification data of an operator. The operator authentication unit authenticates the identification data of the operator by the authentication data of the data file. The print execution unit prints out result data, according to whether the authenticated identification data is appropriate or inappropriate, along with the data body of the data file.

According to another aspect of the first embodiment, an image forming device transmits a data file to a printer device, and the data file is printed out by the printer device. The data file includes a data body, which is printed out, and additional data, which is not printed out. The additional data of the data file to be transmitted to the printer device includes at least authentication data. The image forming device includes an identification entry unit, an operator authentication unit, and a print execution unit. The identification entry unit accepts an entry of identification data of an operator. The operator authentication unit authenticates the identification data of the operator by the authentication data of the data file. The print execution unit transmits result data, according to whether the authenticated identification data is appropriate or inappropriate, along with the data body of the data file to the printer device, and the result data and the data body are printed out by the printer device.

According to another aspect of the first embodiment, an image forming device receives a data file from a remote computer device, and prints out the received data file. Further, the data file includes a data body, which is printed out, and additional data, which is not printed out. The additional data of the data file received from the computer device includes at least authentication data. The image forming device includes an identification entry unit, an operator authentication unit, and a print execution unit. The identification entry unit accepts an entry of identification data of an operator. The operator authentication unit authenticates the identification data of the operator by the authentication data of the data file. The print execution unit prints out result data, according to whether the authenticated identification data is appropriate or inappropriate, along with the data body of the data file.

The image forming device authenticates the identification data of the operator, who prints out the data file, by the authentication data of the data file to be printed out. The authentication result is printed out as the result data along with the data body.

Each of the units described above may be formed so as to execute each function. For example, each of the units may be realized as exclusive hardware for carrying out a prescribed function, a computer device assigned with a prescribed function by a computer program, a prescribed function realized in the computer device by the computer program, or any combination of these.

Various constituent elements are not necessarily required to be individually independent. A plurality of constituent elements may be formed as one component. One constituent element may be formed by a plurality of components. A certain constituent element may be a portion of another constituent element. A portion of a certain constituent element may overlap with a portion of another constituent element.

To enable execution of data processing by reading a computer program, the image forming device includes hardware constructed by general-purpose devices such as a Central Processing Unit (CPU), a Read Only Memory (ROM), a Random Access Memory (RAM), and an interface unit or the like, an exclusive logical circuit constructed to execute a prescribed data processing, or a combination of these.

According to one aspect of a second embodiment, an image forming device prints out print data onto a printing medium. The image forming device includes a file conversion unit, an authentication processing unit, a result conversion unit, and a print execution unit. The file conversion unit converts a data file with authentication data into print data. The authentication processing unit authenticates the data file, which is converted into the print data, by the authentication data. The result conversion unit converts an authentication result into print data of a machine-readable compressed image. The print execution unit prints out the print data of an authentication result along with the print data of the data file.

According to another aspect of the second embodiment, an image forming device transmits print data to a remote printer device, and the print data is printed onto a printing medium by the printer device. The image forming device includes a file conversion unit, an authentication processing unit, a result conversion unit, and a print execution unit. The file conversion unit converts a data file with authentication data into print data. The authentication processing unit authenticates the data file, which is converted into the print data, by the authentication data. The result conversion unit converts an authentication result into print data of a machine-readable compressed image. The print execution unit transmits the print data of the authentication result to the printer device along with the print data of the data file, and the print data are printed out by the printer device.

According to another aspect of the second embodiment, an image forming device converts a data file received from a remote computer device into print data, and prints out the print data onto a printing medium. The image forming device includes a file conversion unit, an authentication processing unit, a result conversion unit, and a print execution unit. The file conversion unit receives a data file with authentication data from the computer device, and converts the data file into print data. The authentication processing unit authenticates the data file, which is converted into the print data, by the authentication data. The result conversion unit converts an authentication result into print data of a machine-readable compressed image. The print execution unit prints out the print data of the authentication result along with the print data of the data file.

Since the authentication result is printed out as a machine-readable compressed image along with the data file, even when the authentication result is detailed, a print area of the authentication result is extremely small. A scanner device or the like can scan the compressed image of the authentication result to reproduce the detailed authentication result.

Each of the units described above may be formed so as to execute each function. For example, each of the units may be realized as exclusive hardware for carrying out a prescribed function, a computer device assigned with a prescribed function by a computer program, a prescribed function realized in the computer device by the computer program, or any combination of these.

Various constituent elements are not necessarily required to be individually independent. A plurality of constituent elements may be formed as one component. One constituent element may be formed by a plurality of components. A certain constituent element may be a portion of another constituent element. A portion of a certain constituent element may overlap with a portion of another constituent element.

To enable execution of data processing by reading a computer program, the computer device includes hardware constructed by general-purpose devices such as a CPU, ROM, a RAM, and an interface unit or the like, an exclusive logical circuit constructed to execute a prescribed data processing, or a combination of these.

The compressed image is an image which may be restored by scanning recorded information by a machine, and which may printed out within a sufficiently small area compared with when the recorded information is printed out as text data. For example, the compressed image may be an existing two-dimensional code such as a QR code (registered trademark), a VS code (registered trademark), a Communication Platform (CP) code or a color code.

The image forming device authenticates the identification data of the operator by the authentication data of the data file. Then, the image forming device prints out the result data, according to whether the authenticated identification data is appropriate or inappropriate, along with the data body of the data file. Accordingly, it is possible to confirm whether the operator who has printed out the data file is appropriate or inappropriate according to the print result.

The image forming device prints out the authentication result as a machine-readable compressed image along with the data file. Accordingly, the detailed authentication result may be printed out within an extremely small print area without interfering with the print region of the data file. The compressed image may be scanned by the scanner device or the like, and the detailed authentication result may be reproduced. Therefore, the detailed authentication result may be obtained from the print result, and data of the authentication result may be managed.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 2 is a block diagram illustrating a physical structure of the data processing system according to the first embodiment of the present invention.

FIG. 8 schematically illustrates text data of an authentication result.

FIG. 12 is a schematic front view illustrating a print result according to another example of the second preferred embodiment of the present invention.

DETAILED DESCRIPTION OF PREFERRED EMBODIMENTS

First Embodiment

Figure 1:
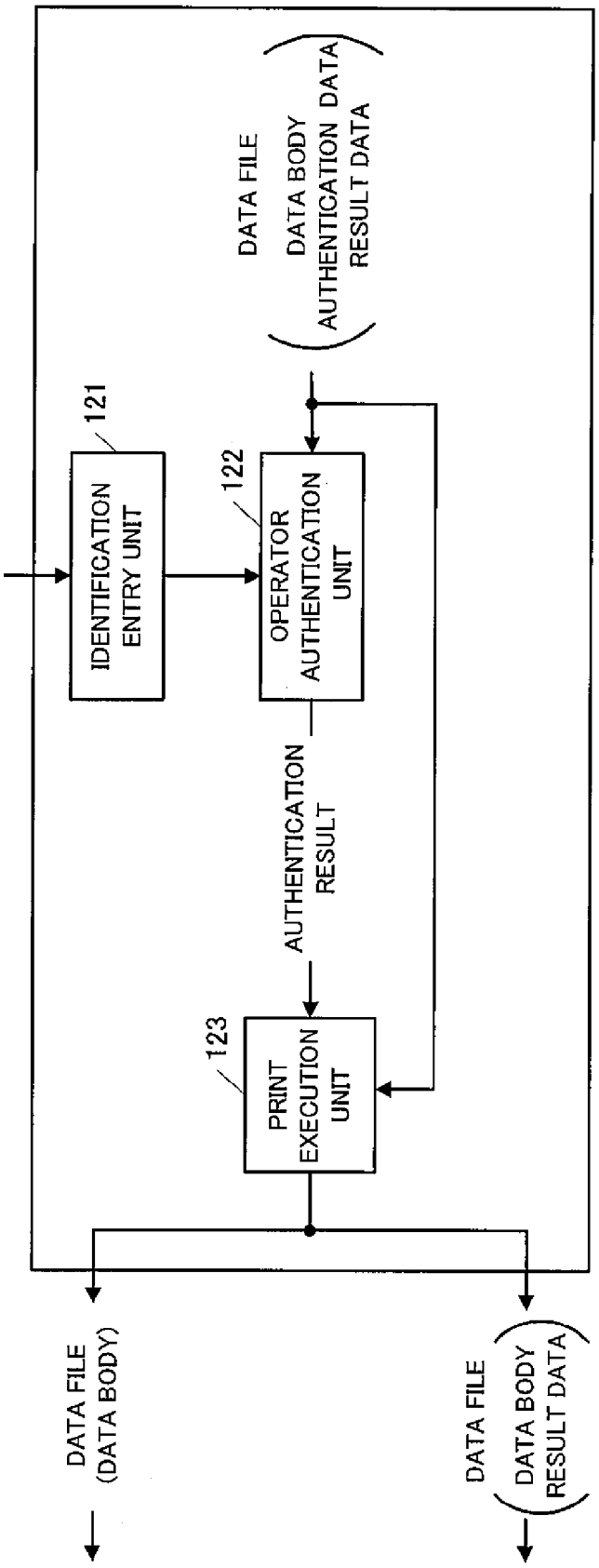
FIG. 1 is a schematic block diagram illustrating a logical structure of a data processing system according to a first embodiment of the present invention.

With reference to FIGS. 1-7, a first embodiment of the present invention is described. For parts of the invention that are the same as those in the above-described conventional arts, the same names are used and detailed descriptions are omitted.

As illustrated in FIG. 2, a data processing system 1000 as an image forming device includes a computer device 100 and a printer device 114. The computer device 100 and the printer device 114 are connected via a Local Area Network (LAN) or the like (not illustrated).

The computer device 100 includes a CPU 101. A ROM 103, a RAM 104, a Hard Disk Drive (HDD) 105, a Floppy Disk Drive (FDD) 107, a Compact Disk (CD) drive 109, a keyboard 110, a mouse 111, a display unit 112, and an interface unit 113 or the like are connected to the CPU 101 via a bus line 102. An FD 106 can be inserted into the FDD 107, and is exchangeable. A CD-ROM 108 can be inserted into the CD drive 109, and is exchangeable.

In the computer device 100, hardware components such as the ROM 103, the RAM 104, the HDD 105, the exchangeable FD 106, and the exchangeable CD-ROM 108 correspond to information storage mediums. At least one of these hardware components stores software of a computer program and a resource for the CPU 101.

Such software is previously installed in the computer device 100. When the computer device 100 is started, the software is stored to the RAM 104 and can be read by the CPU 101.

The CPU 101 executes various processes according to the computer program. Accordingly, as illustrated in FIG. 1, the data processing system 1000 logically includes an identification entry unit 121, an operator authentication unit 122, and a print execution unit 123 or the like. The identification entry unit 121 accepts an entry of identification data D of an operator. The operator authentication unit 122 authenticates the identification data D of the operator by authentication data of a data file F. The print execution unit 123 prints out result data R, according to whether the authenticated identification data D is appropriate or inappropriate, along with the data body B of the data file F.

The identification entry unit 121 and the operator authentication unit 122 are realized as a processing operation of the computer device 100 according to the computer program. The print execution unit 123 is realized in the data processing system 1000 as a collaboration operation of the computer device 100 and the printer device 114 according to the computer program.

Figure 3A:
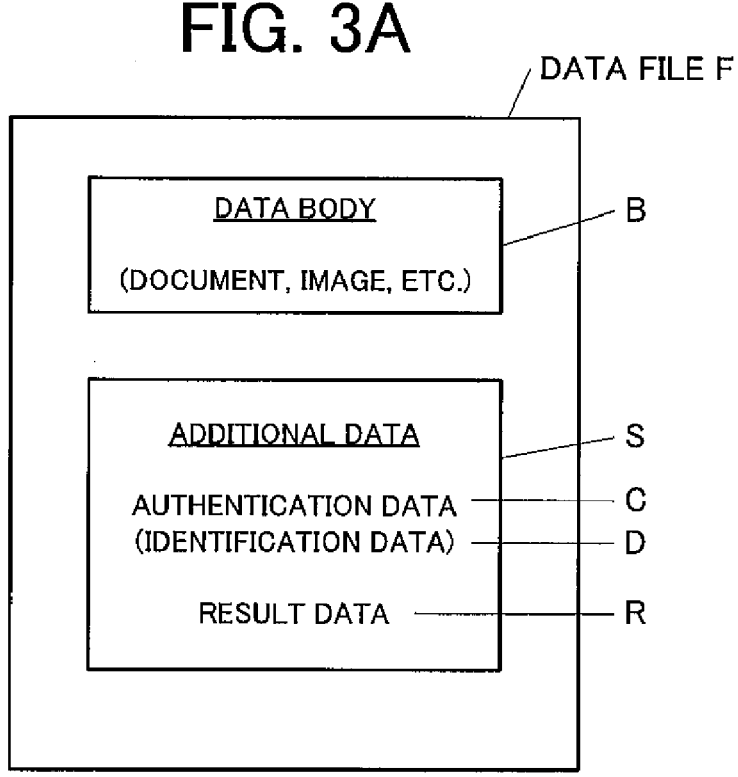
FIGS. 3A and 3B schematically illustrate a data structure of a data file.

In the data processing system 1000 according to the first embodiment, as illustrated in FIG. 3A, the data file F has a data structure including the data body B and additional data S in the same manner as an e-document and Portable Document Format (PDF) data.

Figure 4A:
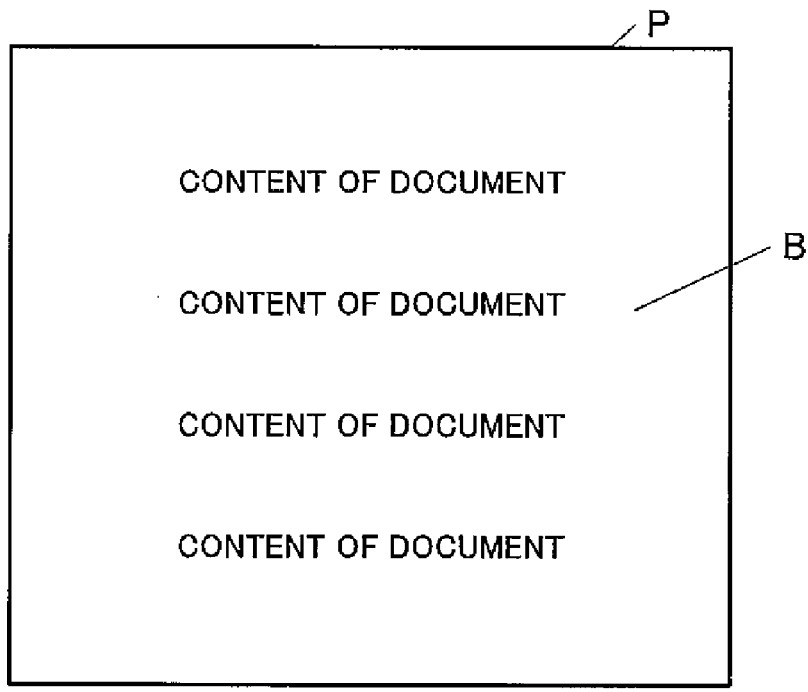
FIGS. 4A and 4B are schematic front views of a print result of the data file.

The data body B includes document data, image data, or the like. As illustrated in FIG. 4A, the data body B is printed out by a normal process. The additional data S includes authentication data C or the like described later in detail. The additional data S is not printed out unless a special process is executed.

In the present embodiment, for each operator using the computer device 100, the identification data D is defined as an Identity (ID) including small text data. For example, in the data file F, the authentication data C includes the identification data D of the operator who has created the data body B.

Figure 4B:
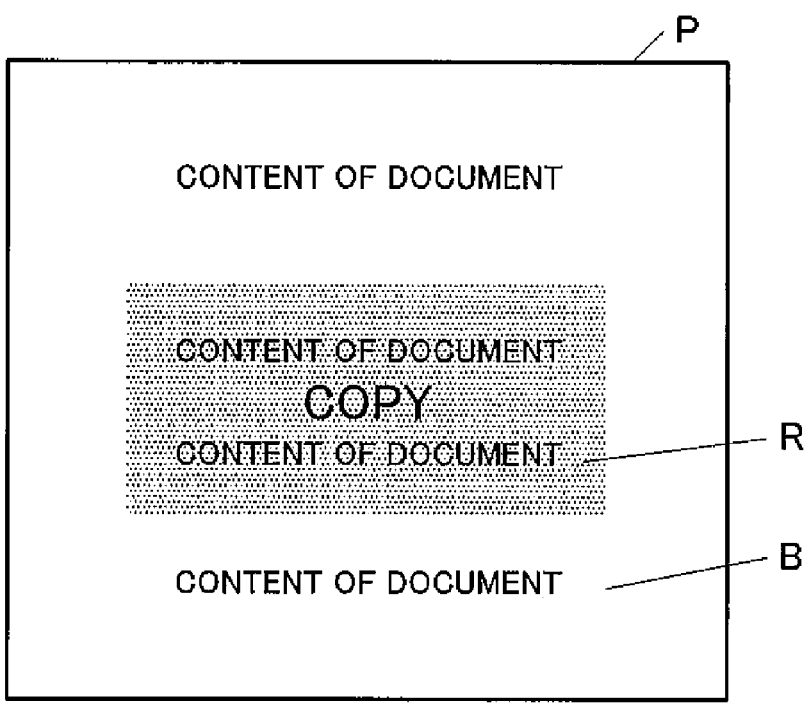

In the data file F, the additional data S also includes the result data R. The result data R is set as a watermark as illustrated in FIG. 4B that is printed out when the identification data D of the operator is determined to be inappropriate as a result of the authentication process.

The watermark of the result data R includes a warning guidance such as "This document has not been printed out by a creator." The watermark of the result data R is printed out under a state in which dots are dispersed such that the composite data body B can be confirmed.

In the computer device 100, for example, the CPU 101 recognizes a manual operation performed by the operator on the keyboard 110 according to a computer program. Accordingly, the identification entry unit 121 accepts an entry of the identification data D of the operator.

The operator authentication unit 122 executes an authentication process by executing a prescribed data processing by the CPU 101. The authentication process is executed by detecting the additional data S from the data file F which has been instructed by the operator to be printed out, detecting the authentication data C from the additional data S, detecting the identification data D from the authentication data C, and verifying the identification data D of the data file F with the entered identification data D.

When the identification data D is determined to be appropriate as a result of the authentication process, the print execution unit 123 converts only the data body B of the data file F into print data, and transmits the converted print data to the printer device 114 from the interface unit 113. When the identification data D is determined to be inappropriate as a result of the authentication process, the print execution unit 123 converts the data body B of the data file F and the result data R into print data, and composes print data. Then, the print execution unit 123 transmits the print data to the printer device 114.

The processing of each of the units 121-124 is realized by the CPU 101, which is hardware, functioning according to the computer program stored in the information storage medium such as the RAM 104. When necessary, each of the units 121-124 is realized using the CPU 101 and also hardware such as the keyboard 110 or the interface unit 113.

Such computer program is stored in the information storage medium such as the RAM 104 as software for executing the following processing operations by the CPU 101 or the like: e.g. accepting an entry of the identification data D of the operator made by operating the keyboard 110 or the like; authenticating the entered identification data D by the identification data D of the data file F to be printed out; and transmitting only the data body B of the data file F to the printer device 114 when the identification data D is determined to be appropriate as a result of the authentication process and printing out the data body B by the printer device 114, or transmitting the data body B of the data file F and the result data R to the printer device 114 when the identification data D is determined to be inappropriate as a result of the authentication process and printing out the data body B and the result data R by the printer device 114.

In the data processing system 1000, for example, the data file F assigned with the authentication data C is registered in the computer device 100, and the data file F can be printed out from the printer device 114 by instructing the computer device 100.

Figure 5:
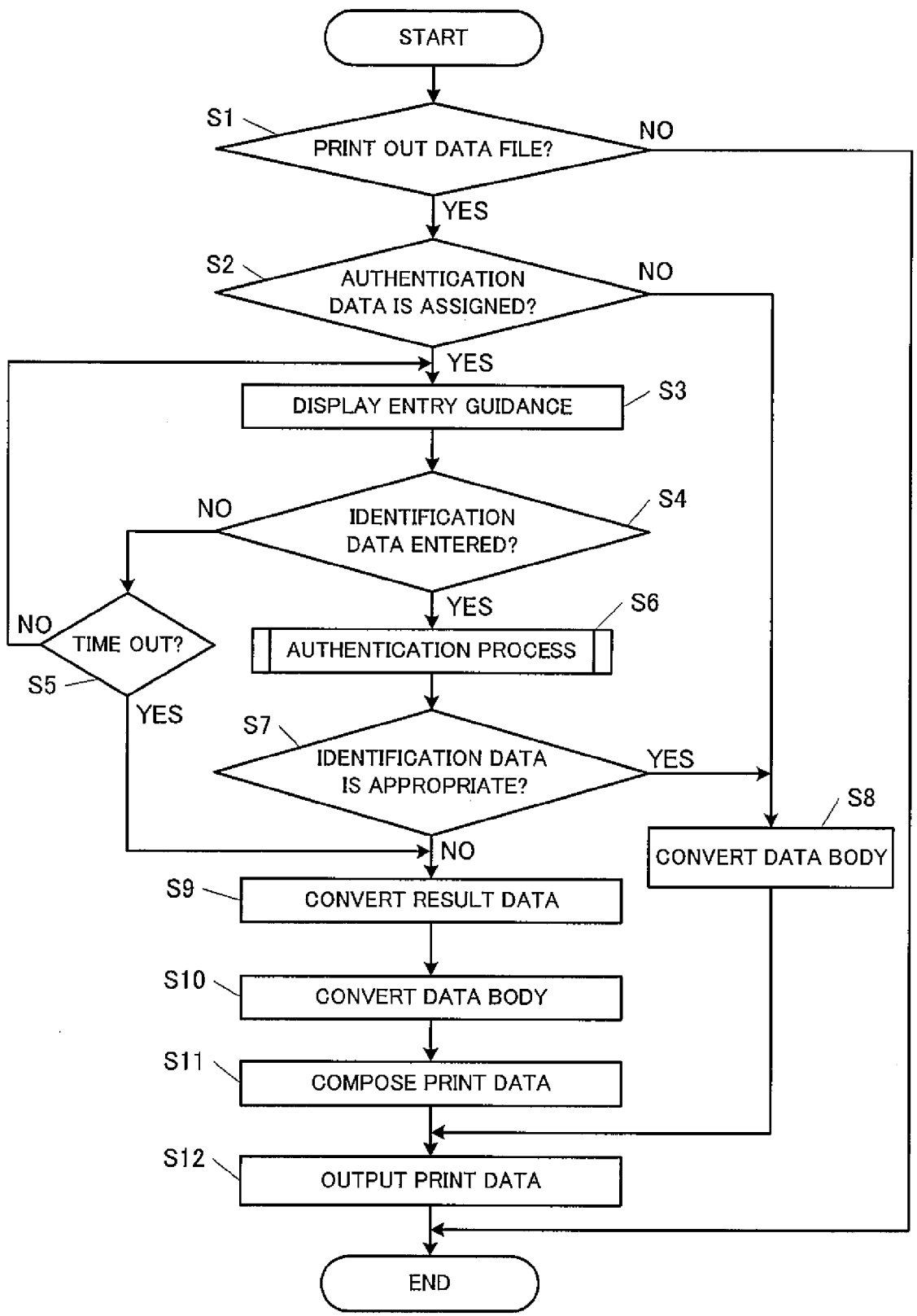
FIG. 5 is a flowchart illustrating a processing operation carried out by a computer device for printing out a data file by a printer device.

For example, when the operator manually operates the computer device 100 to retrieve a desired data file F to print out the data file F, as illustrated in FIG. 5, the operator instructs the computer device 100 to print out the retrieved data file F (step S1).

The computer device 100 confirms whether or not authentication data C is assigned to the data file F (step S2) When the authentication data is not assigned (step S2: NO), the computer device 100 converts the data body B of the data file F into normal print data such as a bitmap (step S8). The print data is transmitted to the printer device 114 from the computer device 100 (step S12). The printer device 114 prints out the data body B of the data file F as illustrated in FIG. 4A.

Meanwhile, when the authentication data C is assigned to the data file F (step S2: YES), the computer device 100 displays an entry guidance such as "Please enter your identification data D" on the display unit 112 (step S3).

The operator, who has confirmed the entry guidance, manually operates the keyboard 110 to enter the identification data D of the operator into the computer device 100 (step S4). The computer device 100 executes an authentication process by detecting the identification data D from the authentication data C of the data file F and verifying the identification data D of the data file F with the entered identification data D (step S6).

When the identification data D of the data file F matches the entered identification data D and a determination is made that the entered identification data D is appropriate as a result of the authentication process (step S7: YES), only the data body B of the data file F is converted into print data (step S8), and the print data is transmitted to the printer device 114 from the interface unit 113 (step S12).

The printer device 114 prints out the received print data onto a printing medium such as printing paper. Only the data body B of the data file F is printed out onto the printing medium P as illustrated in FIG. 4A.

Meanwhile, when the identification data D of the data file F does not match the entered identification data D and a determination is made that the entered identification data D is inappropriate as a result of the authentication process (step S7: NO), each of the data body B of the data file F and the result data R is converted into print data (steps S9 and S10). Then, the converted print data are composed (step S11) and transmitted to the printer device 114 (step S12). The printer device 114 prints out the received print data onto a printing medium such as printing paper.

In the computer device 100, the result data R is set to be composed with the data body B as a watermark. Therefore, as illustrated in FIG. 4B, the data body B is printed out onto the printing medium P along with the watermark of the result data R. The watermark of the result data R includes a warning guidance as described above. The watermark of the result data R is printed out under a state in which the composed data body B can be confirmed.

After the computer device 100 displays the entry guidance for the identification data D on the display unit 112 (step S3), when the identification data D of the operator is not entered even after an elapse of a prescribed period of time (steps S4 and S5), the computer device 100 automatically authenticates that the operator is inappropriate. The computer device 100 composes the data body B of the data file F and the result data R, and the composed data is printed out from the printer device 114 (steps S9 through S12).

In the data processing system 1000, the identification data D of the operator, who prints out the data file F, is authenticated by the authentication data C of the data file F. When the identification data D is determined to be appropriate as a result of the authentication process, only the data body B of the data file F is printed out. When the identification data D is determined to be inappropriate, the data body B and the result data R are composed and printed out. Therefore, it is possible to confirm whether the operator, who has printed out the data file F, is appropriate or inappropriate according to the print result.

The identification data D of the operator is set in the data file F as the authentication data C. Therefore, the computer device 100 is not required to manage the identification data D, and appropriate/inappropriate of an operator can be set for each data file F.

Since the result data R is set in the data file F, the computer device 100 is not required to hold the result data R. A plurality of types of result data R may be selectively set in the data file F according to contents of the data body B.

The identification data D and the result data R may be set as small text data or the like. Therefore, a data volume of the data file F does not excessively increase for the identification data D and the result data R.

In the data processing system 1000, if the authentication data C is not set in the data file F, the data body B is automatically printed out. Therefore, the operator is not requested to enter the identification data D unless needed.

The first embodiment is not limited to the examples described above. Various modifications may be made without departing from the scope of its subject matter. In the above-described embodiment, for example, only when the operator is authenticated to be inappropriate, are the result data R and the data body B of the data file F composed and printed out. Instead, however, the result data R and the data body B may be composed and printed out only when the operator is authenticated to be appropriate.

In this case, the result data R is set as a notification guidance such as "This document has been printed out by a creator", and printed out in an upper or a lower portion of the printing medium P so as not to interfere with the data body B.

Figure 3B:
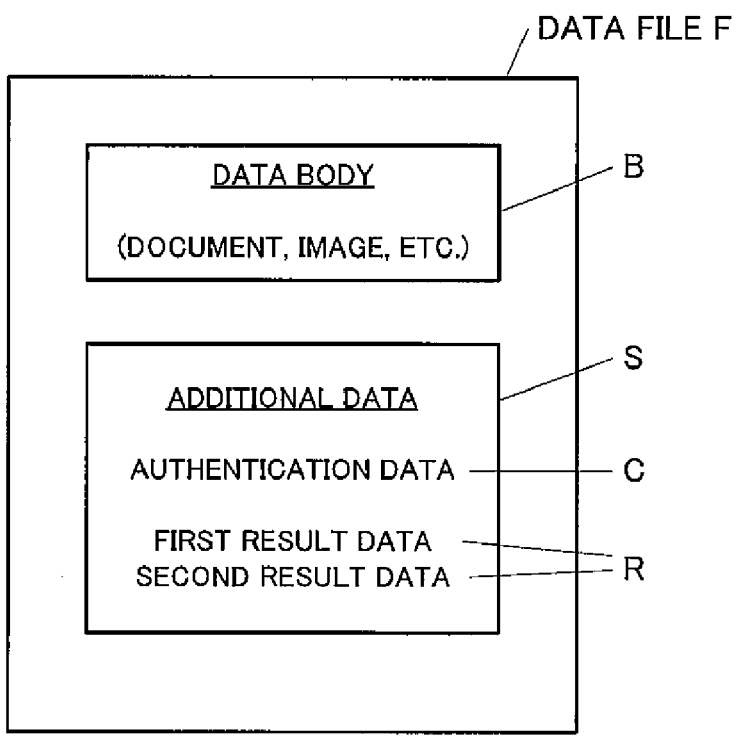

According to the authentication result indicating whether the operator is appropriate or inappropriate, either first or second result data R may be printed out. In this case, as illustrated in FIG. 3B, it is preferable to set the first and the second result data R in the data file F and selectively print out the result data R according to the authentication result.

In the above-described embodiment, the result data R is set in the data file F. However, format result data R may be registered in the computer device 100.

Alternatively, first result data R corresponding to an authentication result, which indicates that the entered identification data D is appropriate, may be registered in the computer device 100. Second result data R corresponding to an authentication result, which indicates that the entered identification data D is inappropriate, may be set in the data file F.

Default result data R may be registered in the computer device 100, and unique result data R may be set in an arbitrary data file F. When the result data R is set in the data file F, the computer device 100 may select the set result data R. When the result data R is not set in the data file F, the computer device 100 may select the default result data R.

In the described embodiment, one identification data D is set in the data file F as the authentication data C. However, a plurality of identification data D may be set in the data file F as the authentication data C.

In the described embodiment, the identification data D of the operator is directly set in the data file F as the authentication data C. However, the authentication data C may be set differently provided that an authentication process may be executed on the identification data D.

For example, when a plurality of operators are classified into a plurality of groups, and whether or not to carry out a printing operation is set for each group, identification data of each group may be included in the identification data D of the operator and the authentication data C.

In the described embodiment, the authentication data C is registered in the data file F. However, for example, a relation between a plurality of identification data D and a plurality of authentication data C may be registered in the computer device 100. An authentication process may be executed on the entered identification data D and the authentication data C assigned to the data file F by the registered relation. In this case, since the authentication data C may be identification data of the data file F, a volume of the data file F may be reduced considerably.

In the described embodiment, the operator enters an ID of the operator including small text data as the identification data D. However, for example, the operator may enter an ID and a password as the identification data D. In this case, only the ID, only the password, or a combination of the ID and the password, or the like may be set as the authentication data C. Accordingly, various authentication processes may be executed.

In the described embodiment, the operator enters the identification data D by manually operating the keyboard 110. However, for example, biological data such as a fingerprint and a voice of the operator may be entered to the computer device 100 as the identification data D. In such a case, the authentication data C may be set by a plurality of characterizing features extracted from the biological data.

In the described embodiment, a series of operations of the computer device 100 has been described with reference to FIG. 5. The order of operations may be changed so long as the operations do not become inconsistent. For example, rather than converting the data body into print data after the authentication process is executed, as described above, the authentication process may be executed after converting the data body into the print data.

In the described embodiment, the identification data D of the operator is authenticated by the authentication data C of the data file F. However, an electronic signature and/or a timestamp may be included in the authentication data C. Then, the identification data D of the operator may be authenticated by the authentication data C of the data file F, and a validity of the data file F may be authenticated by the authentication data C.

In the described embodiment, the CPU 101 operates according to the computer program stored in the RAM 104 or the like, and each unit as various functions of the computer device 100 is logically realized. However, each of the units may also be formed as unique hardware. Some of the units may be formed as software and stored in the RAM 104 or the like, and some of the units may be formed as hardware.

Second Embodiment

With reference to FIGS. 6-12, a second embodiment of the present invention is described. For parts of the second embodiment that are the same as those in the above-described conventional arts, the same names are used and detailed descriptions are omitted.

Figure 7:
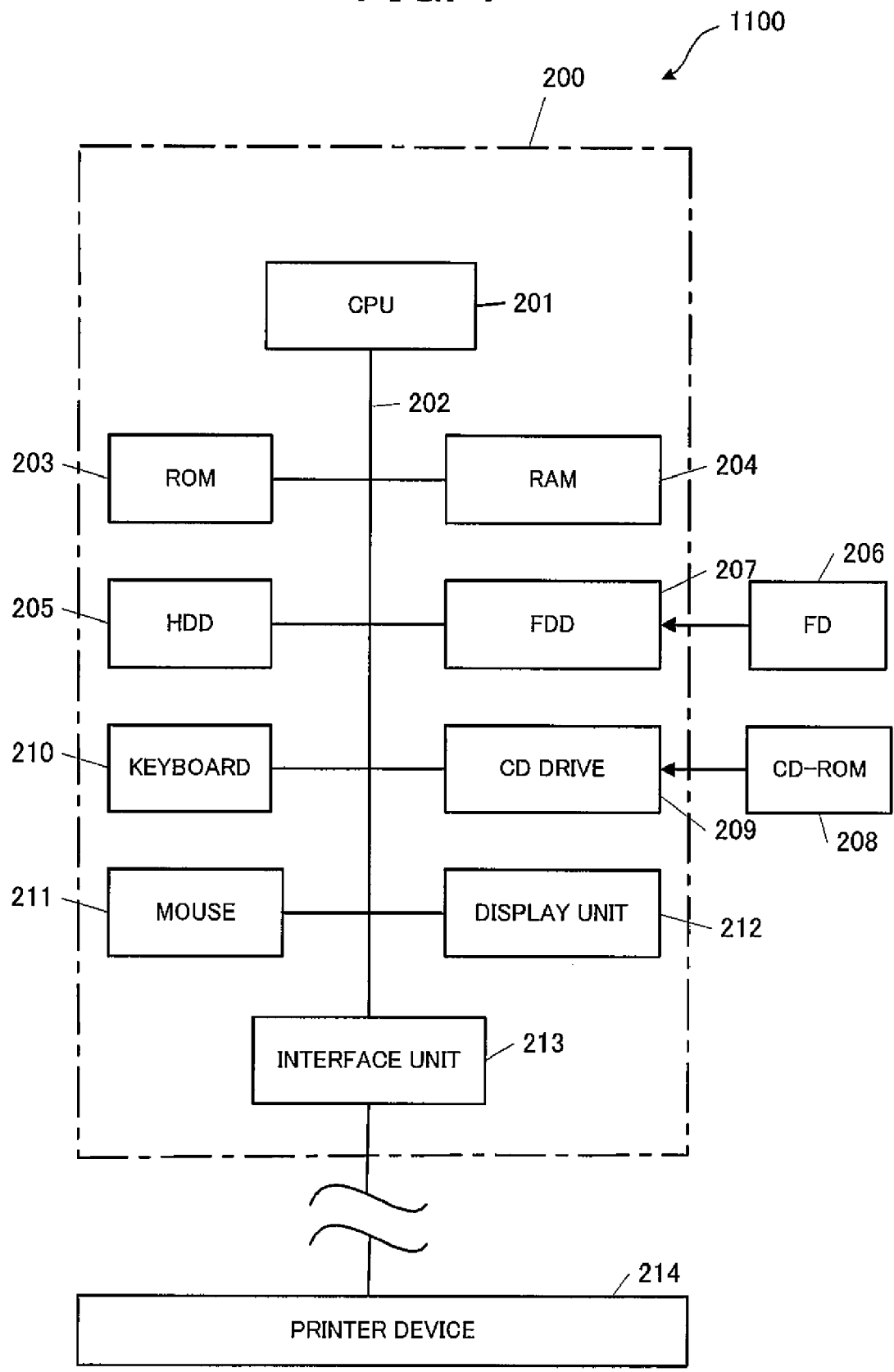
FIG. 7 is a block diagram illustrating a physical structure of the data processing system according to the second embodiment of the present invention.

As illustrated in FIG. 7, a data processing system 1100 as an image forming device includes a computer device 200 and a printer device 214. The computer device 200 and the printer device 214 are connected via a LAN or the like (not illustrated).

The computer device 200 includes a CPU 201. A ROM 203, a RAM 204, an HDD 205, an FDD 207, a CD drive 209, a keyboard 210, a mouse 211, a display unit 212, and an interface unit 213 or the like are connected to the CPU 201 via a bus line 202. An FD 206 can be inserted into the FDD 207, and is exchangeable. A CD-ROM 208 can be inserted into the CD drive 209, and is exchangeable.

In the computer device 200, hardware components such as the ROM 203, the RAM 204, the HDD 205, the exchangeable FD 206, the exchangeable CD-ROM 208 correspond to information storage mediums. At least one of these hardware components stores software of a computer program and a resource for the CPU 201.

Such software is previously installed in the computer device 200. When the computer device 200 is started, the software is stored to the RAM 204 and can be read by the CPU 201.

Figure 6:
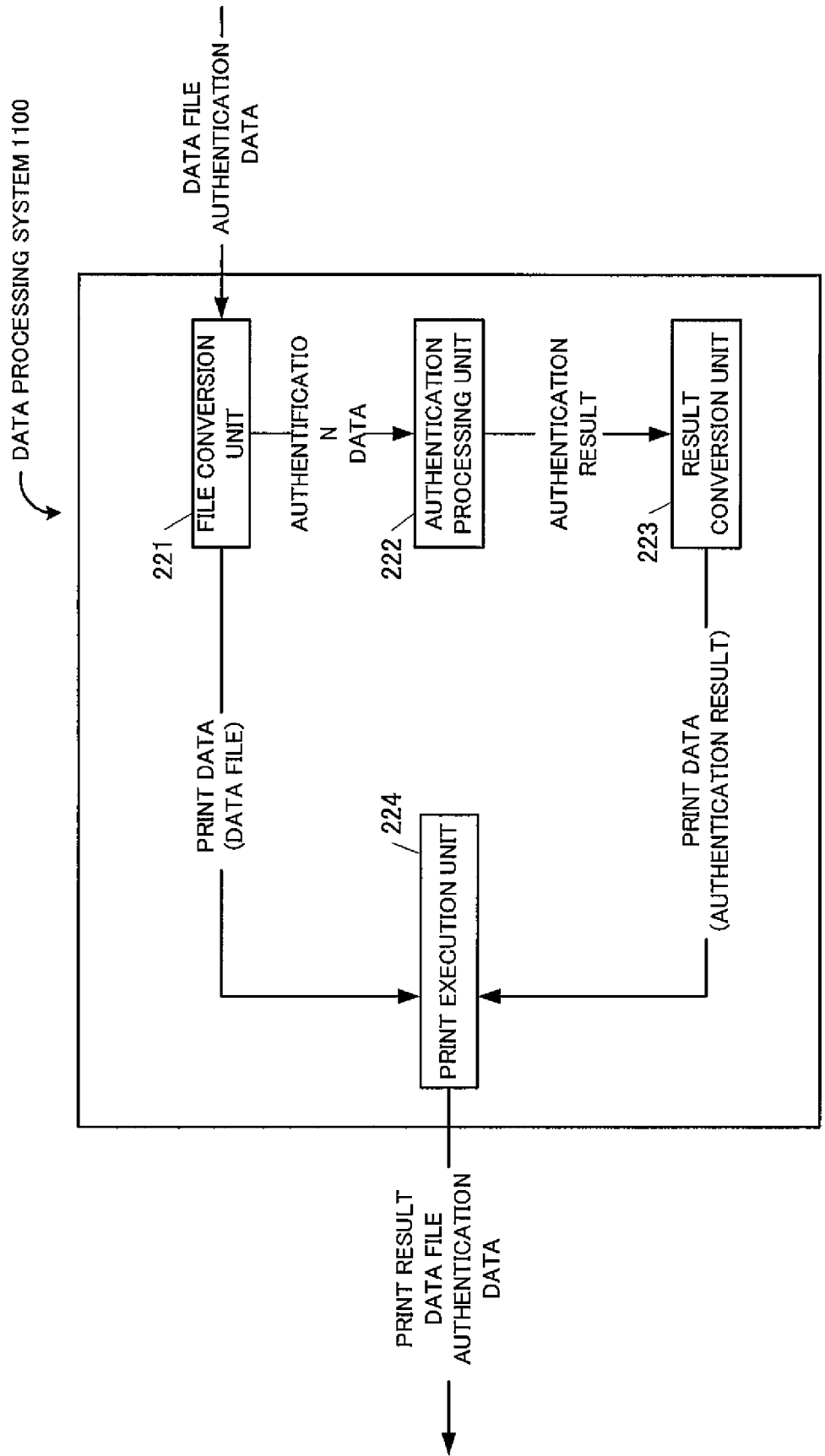
FIG. 6 is a schematic block diagram illustrating a logical structure of a data processing system according to a second embodiment of the present invention.

The CPU 201 executes various processes according to the computer program. Accordingly, as illustrated in FIG. 6, the data processing system 1100 logically includes a file conversion unit 221, an authentication processing unit 222, a result conversion unit 223, and a print execution unit 224 or the like. The file conversion unit 221 converts a data file with authentication data into print data. The authentication processing unit 123 authenticates the data file, which is converted into the print data, by the authentication data. The result conversion unit 223 converts an authentication result into print data of a machine-readable compressed image. The print execution unit 224 prints out the print data of the authentication result and the print data of the data file.

Each of the units 221-223 is realized as a processing operation of the computer device 200 according to the computer program. The print execution unit 224 is realized in the data processing system 1100 as a collaboration operation of the computer device 200 and the printer device 214 according to the computer program.

The data file is an e-document. The data file includes a data body of document data, image data, voice data, a computer program, or a combination of these. The authentication data may be assigned to the data file.

The authentication data may be an electronic signature of an e-document generated according to the data file. The authentication data may include signature data and a timestamp. A hash value of the data body of the data file and a timestamp may be encoded and set in the signature data. A hash value of the data body and date and time of a generation of the authentication data may be encoded and set in the timestamp.

As described above, when the authentication data includes various data, as illustrated in FIG. 8, the authentication processing unit 222 may include at least a portion of the authentication data or an authentication condition or the like in the authentication result, and data may be output as a series of text data.

Figure 9:
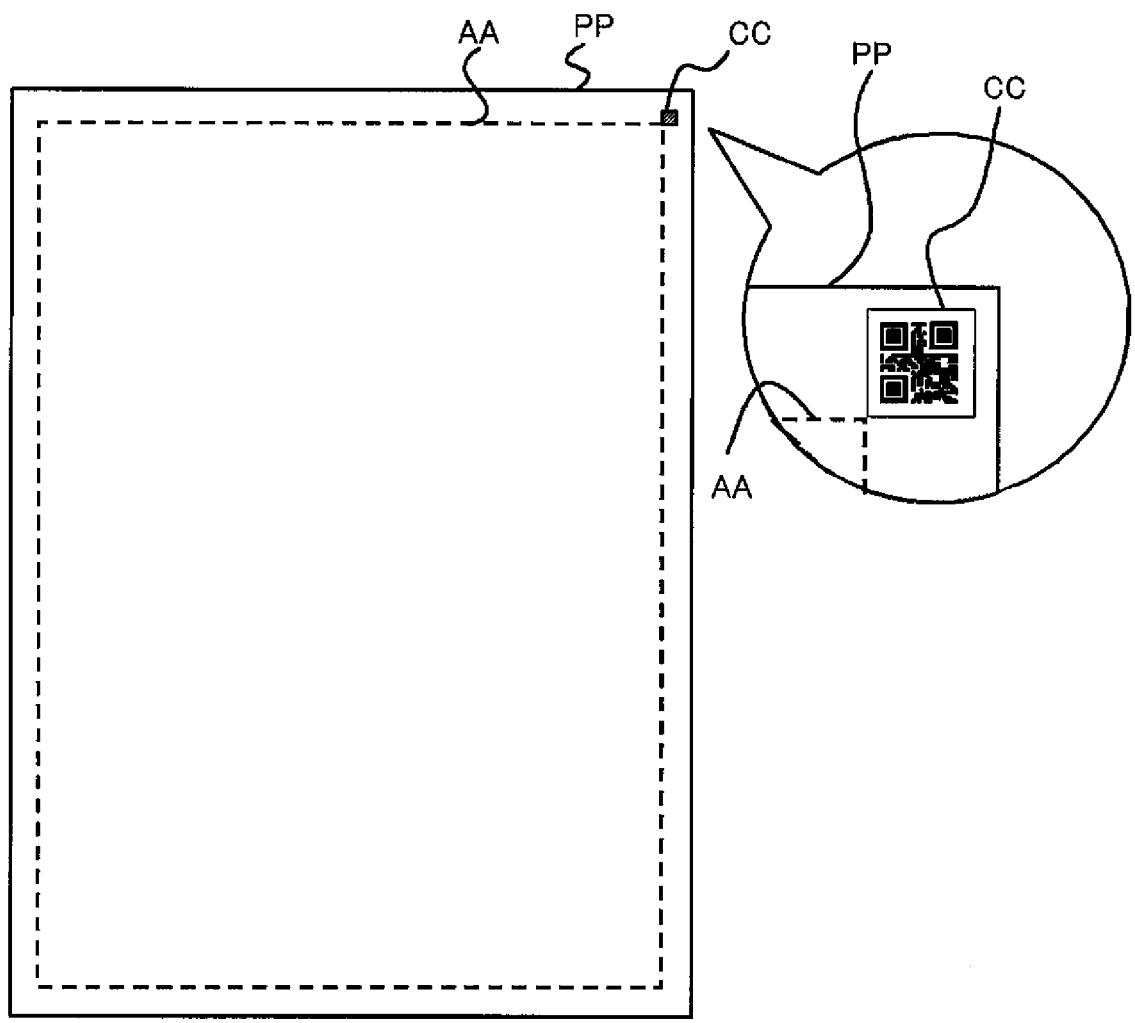
FIG. 9 is a schematic front view illustrating an arrangement of a print region of a data file and a compressed image of an authentication result on a front side of a printing medium.

As described above, when an existing format is used as a machine-readable compressed image, the result conversion unit 223 converts the series of the text data of the authentication result or the like into print data of a machine-readable compressed image by the existing computer program. The print execution unit 224 prints out the print data of the data file in a prescribed region AA of a printing medium PP, and prints out a compressed image CC outside the prescribed region AA as illustrated in FIG. 9.

The processing of each of the units 221-224 is realized by the CPU 201, which is the hardware, functioning according to the computer program stored in the information storage medium such as the RAM 204. When necessary, each of the units 221-224 is realized using the CPU 101 and also hardware such as the HDD 205 and the interface unit 213.

Such a computer program is stored in the information storage medium such as the RAM 204 as software for executing the following processing operations by the CPU 201 or the like: converting the data file with authentication data into print data; authenticating the data file, which is converted into the print data, by the authentication data; converting the authentication result into print data of a machine-readable compressed image CC; and transmitting the print data of the authentication result and the print data of the data file to the remote printer device 214 and printing out the print data by the printer device 214.

In the data processing system 1100, for example, the data file with the authentication data is registered in the computer device 200, and by carrying out an instruction to the computer device 200, the data file can be printed out by the printer device 214.

Figure 10:
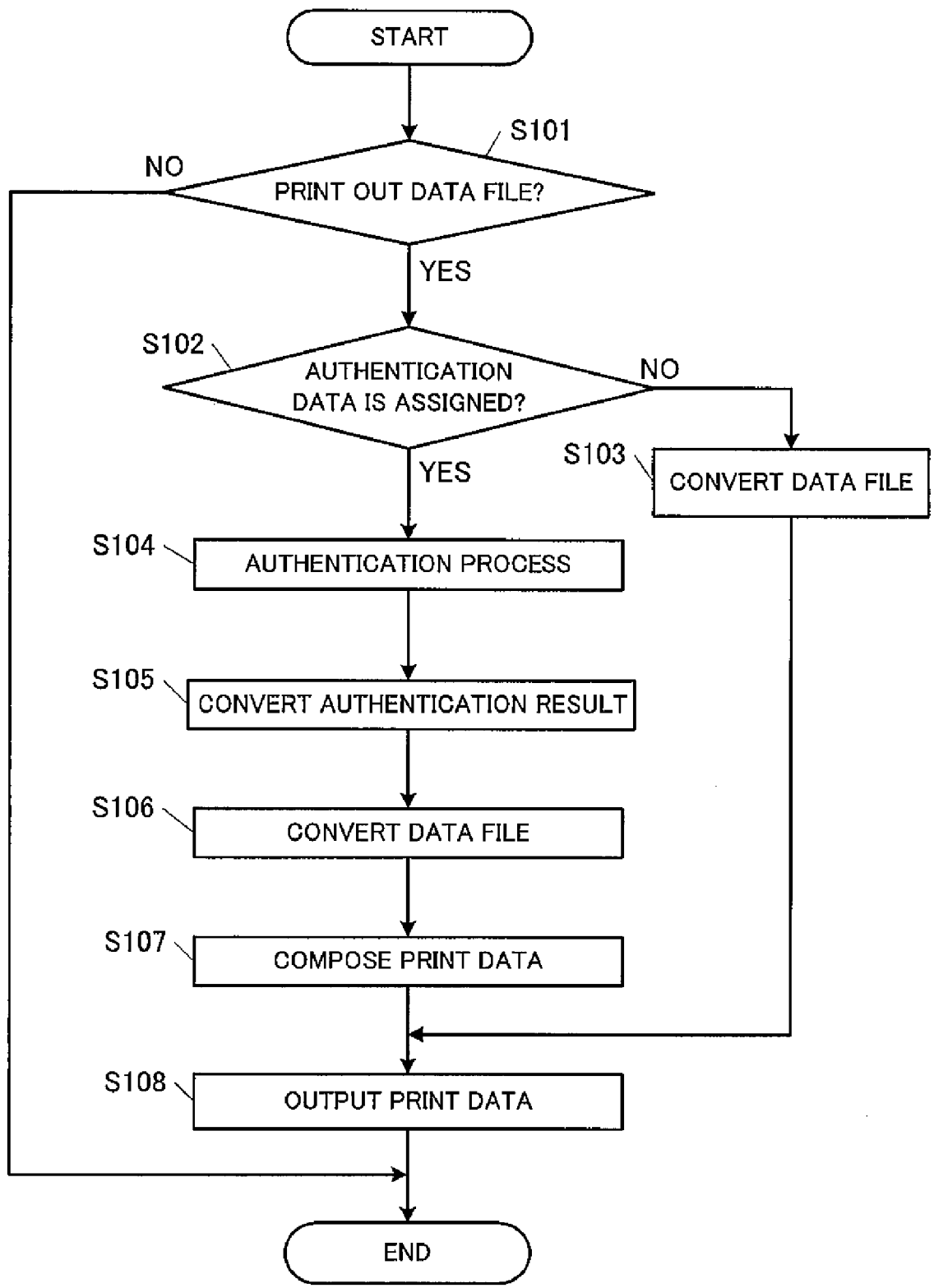
FIG. 10 is a flowchart illustrating a main routine of a processing operation carried out by a computer device for printing out a data file by a printer device.

For example, when the operator manually operates the computer device 200 to retrieve a desired data file to print out the retrieved data file, as illustrated in FIG. 10, the operator instructs the computer device 200 to print out the retrieved data file (step S101).

The computer device 200 confirms whether or not authentication data is assigned to the retrieved data file (step S102). When the authentication data is not assigned to the retrieved data file (step S102: NO), the computer device 200 converts a data body of the data file into normal print data such as a bitmap (step S103). The print data is transmitted to the printer device 214 from the computer device 200 (step S108). Therefore, the printer device 214 prints out the print data of the data file.

Meanwhile, when the authentication data is assigned to the data file (step S102: YES), the computer device 200 authenticates the data file by the authentication data (step S104).

Figure 11:
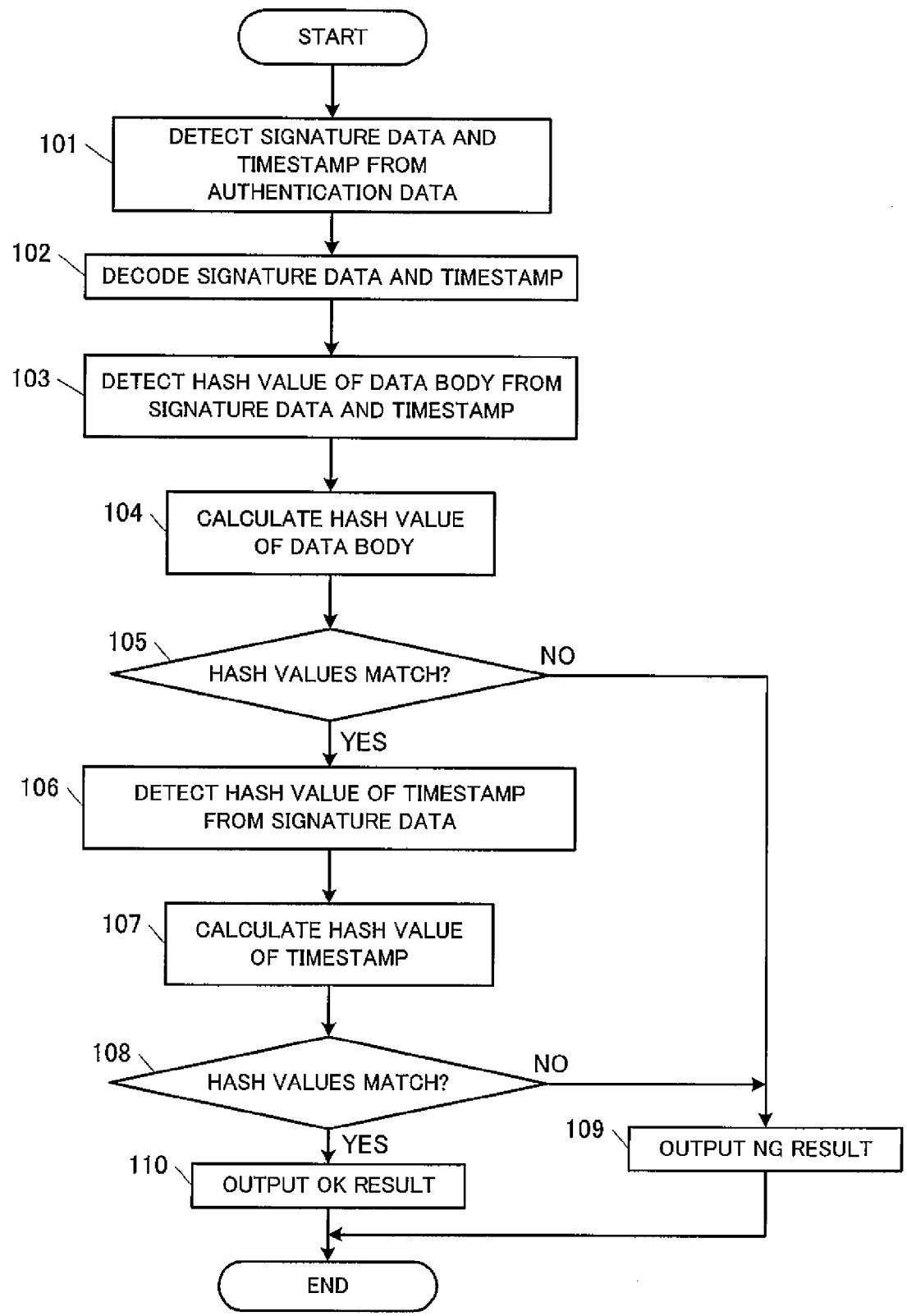
FIG. 11 is a flowchart illustrating a subroutine of an authentication process.

In such a case, as illustrated in FIG. 11, the computer device 200 detects signature data and a timestamp from the authentication data (step T101), and decodes the signature data and the timestamp (step T102). Then, a hash value of the data body is detected from the signature data and the timestamp (step T103). Next, a hash value of the data body is calculated (step T104). Then, the computer device 200 confirms whether or not the hash values match (step T105).

A hash value of the timestamp is detected from the signature data (step T106), and the hash value of the timestamp is calculated (step T107). Then, the computer device 200 confirms whether or not the hash values match (step T108). When the above-described authentication process is completed, an authentication result of OK (matched) or NG (failure) is generated (step T109 or T110). Then, as illustrated in FIG. 10, the authentication result is converted into print data of a machine-readable compressed image (step S105).

The authentication result is generated as "SIGNATURE INFORMATION: VERIFICATION OK" as illustrated in FIG. 8. The authentication result is formed as a series of text data along with authentication data such as "SIGNER: Murata Taro" and an authentication condition such as "HASH ALGORITHM: SHA1". Then, the text data is converted into print data of a compressed image CC such as a QR code as illustrated in FIG. 9.

The data body of the data file is converted into normal print data such as a bitmap (step S106). The print data of this data file and the print data of the compressed image CC are composed (step S107). The composed print data is transmitted from the computer device 200 to the printer device 214 (step S108). Then, the printer device 214 prints out the print data of the data file and the compressed image CC as illustrated in FIG. 9.

In the data processing system 1100, the authentication result is printed out as the machine-readable compressed image CC along with the data file. Therefore, the compressed image of the print result may be scanned by a scanner device or the like, and a detailed authentication result may be reproduced. When confirming the authentication result of the print result, for example, a Charge Coupled Device (CCD) camera (not illustrated) is connected to a computer device including a decoding program for decoding the compressed image CC, and the CCD camera photographs the compressed image CC.

Then, the computer device decodes the photographed image data, and a series of text data of the authentication result and the authentication data is reproduced as illustrated in FIG. 8. The authentication result or the like is displayed on a display of the computer device. Therefore, a user can confirm a detailed authentication result. In addition, since the computer device may store the authentication result, data of the detailed authentication result can be managed.

As illustrated in FIG. 9, the machine-readable compressed image CC has a very small print area, and is printed out outside the print region of the data file. Therefore, the detailed authentication result can be printed out without interfering with the print region of the data file.

The present invention is not limited to the above-described embodiment. Various modifications may be made without departing from the scope of the subject matter of the present invention. For example, in the above-described embodiment, the computer device 200 executes all of the following processes: converting the data file with the authentication data into the print data; authenticating the data file, which is to be converted into the print data, by the authentication data; converting the authentication result into the print data of the machine-readable compressed image CC; and composing the print data of the authentication result and the print data of the data file. However, a part or all of the processes may be executed by the printer device 214.

In the \described \ embodiment, the print data of the authentication result is printed out to an upper-right and outside of the print region of the data file. However, the print data of the authentication result may be printed out at upper-left, lower-right, lower-left, above, below, left, or right of the print region of the data file. The print data of the authentication result may also be printed out within the print region of the data file unless the print data does not interfere with the printed-out image.

In the described embodiment, the print data of the authentication result and the print data of the data file are printed out onto the same side of the printing medium PP. However, when using a printer device capable of carrying out a duplex printing operation (not illustrated), the print data of the data file may be printed out on a front side of the printing medium PP, and the print data of the authentication result may be printed out on a reverse side. In this case, since the print data of the authentication result does not interfere with the print region of the data file at all, a print result of the data file is satisfactory.

By using a printer device capable of carrying out a printing operation on a plurality of types of printing mediums PP (not illustrated), the print data of the data file may be printed out on a first type of the printing medium PP, and the print data of the authentication result may be printed out on a second type of the printing medium PP.

For example, the data file may be printed out on normal printing paper, and the authentication result may be printed out on reuse-paper on which one of the sides has already been printed in another printing operation. As a result, by efficiently using the reuse-papers, unnecessary consumption of the printing papers may be prevented. As another example, the data file may be printed out on normal printing paper, and the authentication result may be printed out on a peel-off sticker. As a result, the peel-off sticker of the authentication result may be pasted on a spine label of a paper file filing a plurality of sheets of the print result of the data files (not illustrated).

In the described embodiment, a compressed image in which black and white are two-dimensionally arranged is printed out. However, for example, by using a color printer device (not illustrated), a color code in which each color is two-dimensionally arranged may be printed out as a compressed image. In this case, a color segmentation may be added as one-dimension to the two-dimensional compressed image. As a result, the compressed image may be expressed as a three-dimensional code.

In the described embodiment, the detailed authentication result is printed out only as a machine-readable compressed image. However, for example, as illustrated in FIG. 12, a minimum authentication result such as "VERIFICATION OK" may be printed out as text data TT below the compressed image CC. In this case, an operator can promptly and visually confirm the minimum authentication result, and the detailed authentication result can also be reproduced and confirmed as needed. As a result, convenience for users improves.

In the described embodiment, the series of the operations of the computer device 200 have been described with reference to FIG. 10 and FIG. 11. However, the order of the series of the operations may be changed so long as the operations do not become inconsistent. For example, rather than detecting the hash value after the signature data and the timestamp are decoded, as described above, the signature data and the timestamp may be decoded after extracting the hash value from the signature data and the timestamp.

In the described embodiment, after obtaining the hash value from the signature data and the timestamp, the hash value of the data body is calculated. However, after calculating the hash value of the data body, the hash value may be obtained from the signature data and the timestamp. Furthermore, in the described embodiment, after confirming the hash value of the data body, the hash value of the timestamp is confirmed. However, after confirming the hash value of the timestamp, the hash value of the data body may be confirmed.

In the described embodiment, the authentication data includes the signature data and the timestamp. However, only one of the signature data and the timestamp may be included in the authentication data, and other data may be included in the authentication data. For example, the signature data may be included in the timestamp, or various data for verifying validity of the data file may be included in the authentication data. Alternatively, an electronic certificate of the signature data may be included in verification data.

In the described embodiment, the CPU 201 operates in accordance with the computer program stored in the RAM 204 or the like, and each unit is logically realized as various functions of the computer device 200. However, each of such units may be formed as unique hardware, and some of the units may be stored in the RAM 204 or the like as software, and some of the units may be formed as hardware.

While the present invention has been described with respect to embodiments thereof, it will be apparent to those skilled in the art that the invention may be modified in numerous ways and may assume many embodiments other than those specifically set out and described above. Accordingly, the appended claims are intended to cover all modifications that fall within the true spirit and scope of the present invention.

What is claimed is:

1. An image forming device comprising:
an identification entry unit that accepts an entry of identification data of an operator using the image forming device;
an operator authentication unit that executes an authentication process on the identification data of the operator by authentication data of a data file including a data body, which is printed out, and additional data, which is not printed out and includes the authentication data, wherein the operator is identified by the identification data; and
a print execution unit that prints out result data, according to whether the authenticated identification data is appropriate or inappropriate, along with the data body of the data file, wherein
the result data is added to the printed out data body when the operator authentication unit determines the authenticated identification is inappropriate, and the result data is not added to the printed out data body when the operator authentication unit determines the authenticated identification is appropriate, and the identification entry unit, operator authentication unit and print execution unit are each embodied in a non-transitory computer readable medium.

2. The image forming device according to claim 1, wherein when the identification data is authenticated to be appropriate as a result of the authentication process, the print execution unit prints out first result data, and when the identification data is authenticated to be inappropriate as a result of the authentication process, the print execution unit prints out second result data.

3. An image forming device comprising:
an identification entry unit that accepts an entry of identification data of an operator using the image forming device;
an operator authentication unit that executes an authentication process on the identification data of the operator by authentication data of a data file including a data body, which is printed out, and additional data, which is not printed out and includes the authentication data, wherein the operator is identified by the identification data; and
a print execution unit that transmits result data, according to whether the authenticated identification data is appropriate or inappropriate, to a remote printer device along with the data body of the data file, and prints out the result data and the data body by the remote printer device, wherein
the result data is added to the printed out data body when the operator authentication unit determines the authenticated identification is inappropriate, and the result data is not added to the printed out data body when the operator authentication unit determines the authenticated identification is appropriate, and
the identification entry unit, operator authentication unit and print execution unit are each embodied in a computer readable medium.

4. The image forming device according to claim 3, wherein when the authenticated identification data is authenticated to be appropriate as a result of the authentication process, the print execution unit transmits first result data along with the data body, and when the authenticated identification data is authenticated to be inappropriate as a result of the authentication process, the print execution unit transmits second result data along with the data body.

5. An image forming device comprising:
a reception unit that receives a data file including a data body, which is printed out, and additional data, which is not printed out and includes authentication data, from a remote computer device;
an identification entry unit that accepts an entry of identification data of an operator using the image forming device;
an operator authentication unit that executes an authentication process on the identification data of the operator by the authentication data of the data file, wherein the operator is identified by the identification data; and
a print execution unit that prints out result data, according to whether the authenticated identification data is appropriate or inappropriate, along with the data body of the data file, wherein
the result data is added to the printed out data body when the operator authentication unit determines the authenticated identification is inappropriate, and the result data is not added to the printed out data body when the operator authentication unit determines the authenticated identification is appropriate, and the reception unit, identification entry unit, operator authentication unit and print execution unit are each embodied in a non-transitory computer readable medium.

6. The image forming device according to claim 5, wherein when the identification data is authenticated to be appropriate as a result of the authentication process, the print execution unit prints out first result data, and when the identification data is authenticated to be inappropriate as a result of the authentication process, the print execution unit prints out second result data.

7. A computer program for a device embodied in a non-transitory computer readable medium and executed on a processor to perform the steps of:
accepting an entry of identification data of an operator using the image forming device;
authenticating the identification data of the operator by authentication data of a data file including a data body, which is printed out, and additional data, which is not printed out and includes the authentication data, wherein the operator is identified by the identification data; and
transmitting result data, according to whether the authenticated identification data is appropriate or inappropriate, along with the data body of the data file to a remote printer device, and printing out the result data and the data body by the remote printer device,
wherein the result data is added to the printed out data body when the authenticated identification is inappropriate, and the result data is not added to the printed out data body when the authenticated identification is appropriate.

8. A computer program for a device embodied in a non-transitory computer readable medium and executed on a processor to perform the steps of:
authenticating identification data of an operator of the device by authentication data of a data file including a data body, which is printed out, and additional data, which is not printed out and includes the authentication data, wherein the operator is identified by the identification data; and
printing out result data, according to whether the authenticated identification data is appropriate or inappropriate, along with the data body of the data file,
wherein the result data is added to the printed out data body when the authenticated identification is inappropriate, and the result data is not added to the printed out data body when the authenticated identification is appropriate.

9. A data file embodied in a non-transitory computer readable medium and executed on a processor comprising:
a data body, which is printed out; and
additional data, which is not printed out and at least includes:
authentication data for authenticating identification data of an operator, and
result data indicating an authentication result of the identification data
wherein the result data is added to the printed out data body when the authenticated identification is inappropriate, and the result data is not added to the printed out data body when the authenticated identification is appropriate.

10. An image forming device comprising:
a file conversion unit that converts a data file with authentication data into print data;

an authentication processing unit that authenticates the data file, which is converted into the print data, by the authentication data;

a result conversion unit that converts an authentication result into print data of a machine-readable compressed image; and a print execution unit that prints out the print data of the authentication result and the print data of the data file onto a printing medium, wherein the authentication result is added to the printed out print data when the authentication is inappropriate, and the authentication data is not added to the printed out print data when the authentication is appropriate, and the file conversion unit, authentication processing unit, result conversion unit and print execution unit are each embodied in a computer readable medium.

11. The image forming device according to claim 10, wherein at least a portion of the authentication data is included into the authentication result by the result conversion unit.

12. An image forming device comprising:

a file conversion unit that converts a data file with authentication data into print data;

an authentication processing unit that authenticates the data file, which is converted into the print data, by the authentication data;

a result conversion unit that converts an authentication result into print data of a machine-readable compressed image; and a print execution unit that transmits the print data of the authentication result and the print data of the data file to a remote printer device, and prints out the print data onto a printing medium by the printer device, wherein the authentication result is added to the printed out print data when the authentication is inappropriate, and the authentication data is not added to the printed out print data when the authentication is appropriate, and the file conversion unit, authentication processing unit, result conversion unit and print execution unit are each embodied in a non-transitory computer readable medium.

13. The image forming device according to claim 12, wherein at least a portion of the authentication data is included into the authentication result by the result conversion unit.

14. An image forming device comprising:

a file conversion unit that receives a data file with authentication data from a remote computer device, and converts the received data file into print data;

an authentication processing unit that authenticates the data file, which is converted into the print data, by the authentication data;

a result conversion unit that converts an authentication result into print data of a machine-readable compressed image; and a print execution unit that prints out the print data of the authentication result and the print data of the data file onto a printing medium, wherein the authentication result is added to the printed out print data when the authentication is inappropriate, and the authentication data is not added to the printed out print data when the authentication is appropriate, and the file conversion unit, authentication processing unit result conversion unit and print execution unit are each embodied in a non-transitory computer readable medium.

15. The image forming device according to claim 14, wherein at least a portion of the authentication data is included into the authentication result by the result conversion unit.

16. A computer program for a device embodied in a non-transitory computer readable medium and executed by a processor to perform the steps of:

converting a data file with authentication data into print data;

authenticating the data file, which is converted into the print data, by the authentication data;

converting an authentication result into print data of a machine-readable compressed image; and transmitting the print data of the authentication result and the print data of the data file to a printer device, and printing out the print data onto a printing medium by the printer device, wherein the authentication result is added to the printed out print data when the authentication is inappropriate, and the authentication data is not added to the printed out print data when the authentication is appropriate.

17. A computer program for a device embodied in a non-transitory computer readable medium and executed by a processor to perform the steps of:

receiving a data file with authentication data from a remote computer device, and converting the received data file into print data;

authenticating the data file, which is converted into the print data, by the authentication data;

converting an authentication result into print data of a machine-readable compressed image; and printing out the print data of the authentication result and the print data of the data file onto a printing medium, wherein the authentication result is added to the printed out print data when the authentication is inappropriate, and the authentication data is not added to the printed out print data when the authentication is appropriate.

* * * * *